(12) United States Patent
Hanken

(10) Patent No.: US 7,971,586 B2
(45) Date of Patent: Jul. 5, 2011

(54) SOLAR HEATING SYSTEM AND METHOD OF FORMING A PANEL ASSEMBLY THEREFOR

(76) Inventor: Michael J. Hanken, Lakeland, FL (US)

( * ) Notice: Subject to any disclaimer, the term of this patent is extended or adjusted under 35 U.S.C. 154(b) by 389 days.

(21) Appl. No.: 11/954,405

(22) Filed: Dec. 12, 2007

(65) Prior Publication Data

US 2008/0141999 A1      Jun. 19, 2008

Related U.S. Application Data

(60) Provisional application No. 60/869,827, filed on Dec. 13, 2006, provisional application No. 60/870,863, filed on Dec. 20, 2006.

(51) Int. Cl.
*F24J 2/26* (2006.01)

(52) U.S. Cl. ........ 126/621; 126/623; 126/659; 126/661; 126/663; 126/674

(58) Field of Classification Search ................ 126/621, 126/622, 623, 651, 658, 659, 660, 661, 662, 126/663, 674, 171, 46, 56, 69; 403/69, 70, 403/71, 335, 397
See application file for complete search history.

(56) References Cited

U.S. PATENT DOCUMENTS

| | | | | |
|---|---|---|---|---|
| 598,342 A | * | 2/1898 | Hawkins | 24/570 |
| 609,369 A | * | 8/1898 | Robinson | 403/397 |
| 822,994 A | * | 6/1906 | Shuflin et al. | 403/392 |
| 1,903,125 A | * | 3/1933 | Modine | 165/81 |
| 2,469,963 A | * | 5/1949 | Grosjean et al. | 165/56 |
| 2,548,036 A | * | 4/1951 | Milborn | 165/56 |
| 2,619,328 A | * | 11/1952 | Polad | 165/53 |
| 2,688,794 A | * | 9/1954 | Malutich | 29/890.038 |
| 2,721,731 A | * | 10/1955 | Rapp | 165/56 |
| 2,736,406 A | * | 2/1956 | Johnson | 52/761 |
| 2,751,198 A | * | 6/1956 | Rapp | 165/56 |
| 2,799,481 A | * | 7/1957 | Becker | 165/171 |
| 2,862,692 A | * | 12/1958 | Wolf | 165/56 |
| 2,940,737 A | * | 6/1960 | Sandberg | 165/171 |
| 3,023,753 A | * | 3/1962 | Wheless | 607/95 |
| 3,031,171 A | * | 4/1962 | Buttner | 165/182 |
| 3,039,453 A | * | 6/1962 | Andrassy | 126/661 |
| 3,380,518 A | * | 4/1968 | Taverna et al. | 165/171 |
| 3,621,671 A | * | 11/1971 | Ullrich | 62/235 |
| 3,818,568 A | * | 6/1974 | Sennstrom | 29/727 |

(Continued)

FOREIGN PATENT DOCUMENTS

DE          28 09 550       *   9/1979

(Continued)

*Primary Examiner* — Carl D Price
(74) *Attorney, Agent, or Firm* — Allen Dyer Doppelt Milbrath & Gilchrist

(57) ABSTRACT

A solar heating system for mounting under a roof includes a panel formed of a sheet material, the panel having substantially opposed first and second surfaces and adapted for attachment under the roof with the first surface substantially facing the roof. A plurality of tubing fasteners extend outward from the second surface of the panel, and at least one run of tubing is held against the second surface of the panel by the plurality of tubing fasteners. The plurality of tubing fasteners can be partially cut-out and bent portions of the sheet material. The system can also include a sidewall formed by folding a portion of the sheet material toward the second surface along a line of weakness and standoff tabs extending from the first surface formed as partially cut-out and bent portions of the sheet material.

17 Claims, 4 Drawing Sheets

U.S. PATENT DOCUMENTS

| | | | | |
|---|---|---|---|---|
| 3,968,837 A | * | 7/1976 | Makara | 165/135 |
| 4,016,861 A | * | 4/1977 | Taylor | 126/620 |
| 4,079,724 A | * | 3/1978 | Zwillinger | 126/658 |
| 4,083,360 A | | 4/1978 | Courvoisier et al. | 126/271 |
| 4,094,301 A | * | 6/1978 | Sorenson et al. | 126/659 |
| 4,098,260 A | * | 7/1978 | Goettl | 126/583 |
| 4,164,935 A | * | 8/1979 | Marles et al. | 126/659 |
| 4,182,013 A | * | 1/1980 | Grossman | 29/890.033 |
| 4,197,834 A | | 4/1980 | Nevins | 126/442 |
| 4,201,193 A | | 5/1980 | Ronc | 126/448 |
| 4,245,620 A | * | 1/1981 | Heinemann | 126/662 |
| 4,285,397 A | * | 8/1981 | Ostbo | 165/163 |
| 4,286,582 A | | 9/1981 | Nevins | 126/446 |
| 4,296,741 A | * | 10/1981 | Harder | 126/658 |
| 4,336,793 A | * | 6/1982 | Ahearn et al. | 126/621 |
| 4,416,265 A | * | 11/1983 | Wallace | 126/660 |
| 4,491,175 A | * | 1/1985 | Bloem | 165/183 |
| 5,042,569 A | * | 8/1991 | Siegmund | 165/56 |
| 5,862,854 A | * | 1/1999 | Gary | 165/55 |
| 5,937,489 A | * | 8/1999 | Gunter | 24/459 |
| 6,220,339 B1 | | 4/2001 | Krecke | 165/48 |
| 6,283,382 B1 | * | 9/2001 | Fitzemeyer | 237/69 |
| 6,647,979 B2 | | 11/2003 | Snyder | 126/621 |
| 7,028,685 B1 | | 4/2006 | Krecke | 126/633 |
| 2005/0016524 A1 | | 1/2005 | Broatch | 126/622 |
| 2005/0199234 A1 | * | 9/2005 | Leighton | 126/621 |
| 2007/0034364 A1 | * | 2/2007 | Wieder | 165/171 |

FOREIGN PATENT DOCUMENTS

| | | | |
|---|---|---|---|
| DE | | 3934719 | 10/1989 |
| GB | | 2183022 A * | 5/1987 |

* cited by examiner

SOLAR HEATING SYSTEM AND METHOD OF FORMING A PANEL ASSEMBLY THEREFOR

CROSS-REFERENCE TO RELATED APPLICATIONS

This application claims the benefit of U.S. Provisional Application No. 60/870,863, filed on Dec. 20, 2006, and U.S. Provisional Application No. 60/869,827, filed on Dec. 13, 2006, the contents of which applications are hereby incorporated by reference in their entirety.

FIELD OF THE INVENTION

The present invention relates to solar heating systems, and particularly to panel assemblies for under-roof solar heating systems and related methods of forming.

BACKGROUND OF THE INVENTION

As the price for fossil fuels steadily increases and the awareness of the potentially adverse environmental impact of burning fossil fuels grows, solar power is more often looked to as an alternative source of cheap, clean energy. While photovoltaic cells can convert solar energy directly into electricity for virtually any use, such cells remain relatively expensive. Also, energy losses during the conversion and subsequent use of the electricity reduce the overall efficiency of systems employing photovoltaic cells.

An alternative method of harnessing solar energy involves using solar energy to directly heat water, or another fluid. Early systems of this type typically employ solar panels, formed of tubing arranged in blankets, placed on the exterior of a roof. Water is pumped up to the panels where it absorbs radiant heat from solar energy impacting on the roof and is then returned for use or storage. There are several disadvantages to such systems. For instance, building owners may find the roof-mounted components aesthetically unappealing, and may be limited to roofing types that provide a suitable mounting surface for the roof-mounted components. Also, periodic re-roofing generally requires complete removal of the roof-mounted components, thus increasing costs. Secure mounting usually requires penetration of the roof, increasing the risks of a leaky roof during adverse weather conditions.

Since a significant portion of the solar energy impacting on a roof will be transmitted through the roofing material, an alternative solution is to mount the solar heating system under the roof. Existing systems of this type largely solve the problem of aesthetics, but Applicant has found such systems to present other problems that increase the time and cost required to install and maintain such systems, as well as costs associated with roof repair and replacement in the vicinity of such systems.

A relatively recent example of a system of this type is found in U.S. Patent Application Publication No. 2005/0199234. In one embodiment of this system, tubing is secured to a roof by a plurality of support members, which are each attached directly to the underside of the roof. Thus, each support member must be separately formed. Likewise, installation requires the time consuming attachment of each support member and replacement of the tubing requires each support member to be removed.

Additionally, attachment of the support members risks completely penetrating the roof, resulting in damage to roofing materials and leaks. Moreover, installation or replacement of the roofing materials over the system, such as replacement of shingles, would likely result in damage to the support members or tubing, for instance by roofing nails dislodging support members or penetrating tubing. If the roofing material to which the support members were mounted required replacement, for example the plywood sheathing under shingles, the support members and tubing would have to be removed and re-installed.

In another embodiment of the '234 Publication, a plurality of fastening legs are all connected to a single support member. While such an arrangement avoids the need to attach the legs directly to the roof, the fastening legs still abut the roof resulting in likely interference with roofing installation or replacement. Additionally, the fastening legs must still be formed separately and attached to the support member, and replacement of tubing requires removal of the support member, together with all of the fastening legs, from their position adjacent to the roof.

SUMMARY OF THE INVENTION

In view of the foregoing, an object of the present invention is to provide a solar heating system, and method of forming a panel assembly therefor, that allow both manufacturing and mounting of system components under a roof, either new or existing, to be accomplished more easily and quickly. Further objects of the present invention include providing a panel assembly, and associated method of forming, that do not require mounting directly to the roof, readily adapt to irregularities in actual mounting locations, allow quick and easy installation, inspection, and replacement of tubing, and do not interfere with installation or reinstallation of roofing materials.

According to an embodiment of the present invention, a solar heating system for mounting under a roof includes a panel formed of a sheet material, the panel having substantially opposed first and second surfaces and adapted for attachment under the roof with the first surface substantially facing the roof. A plurality of tubing fasteners extend outward from the second surface of the panel, and at least one run of tubing is held against the second surface of the panel by the plurality of tubing fasteners.

According to an aspect of the present invention, the plurality of tubing fasteners can be partially cut-out and bent portions of the sheet material. According to other aspects of the present invention, the system can also include a sidewall formed by folding a portion of the sheet material toward the second surface along a line of weakness and standoff tabs extending from the first surface formed as partially cut-out and bent portions of the sheet material.

According to another embodiment of the present invention, a method for forming an under-roof panel assembly includes forming a plurality of fasteners in a sheet material having substantially opposed first and second surfaces by partially cutting out and folding portions of the sheet material to extend from the second surface thereof. At least two sidewalls are formed by folding edge portions of the sheet material toward the second surface. A plurality of standoff tabs can also be formed by partially cutting out and folding additional portions of the sheet material to extend from the first surface thereof, the plurality of standoff tabs being dimensioned to prevent interference between the solar heating panel assembly and roofing attachment means, such as nails, screws or the like.

These and other features, aspects, and advantages of the present invention will be further understood in light of the following drawings and descriptions of preferred embodiments.

DETAILED DESCRIPTION OF A PREFERRED EMBODIMENT

Figure 1:
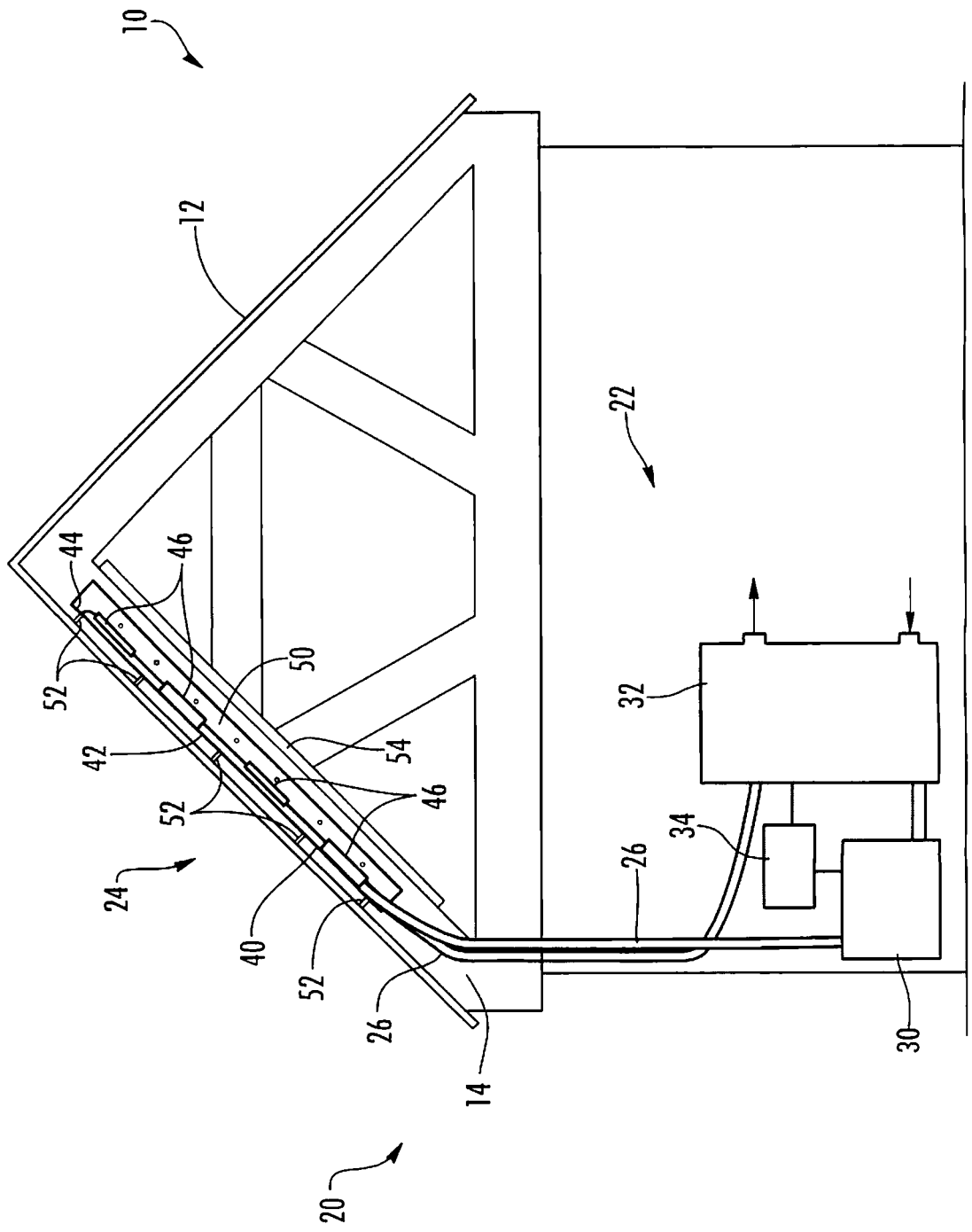
FIG. 1 is a schematic cross-sectional side view of a building having a solar heating system with a panel assembly according to an embodiment of the present invention.

Referring to FIG. 1, building 10 includes a roof 12 supported by a plurality of trusses 14 (only one shown in FIG. 1). A solar heating system 20 includes support equipment 22, an under-roof panel assembly 24 and tubing 26 extending between the support equipment 22 and the panel assembly 24. The support equipment 22 includes a circulating pump 30, a holding tank 32 and an electronic control unit 34.

Figure 2:
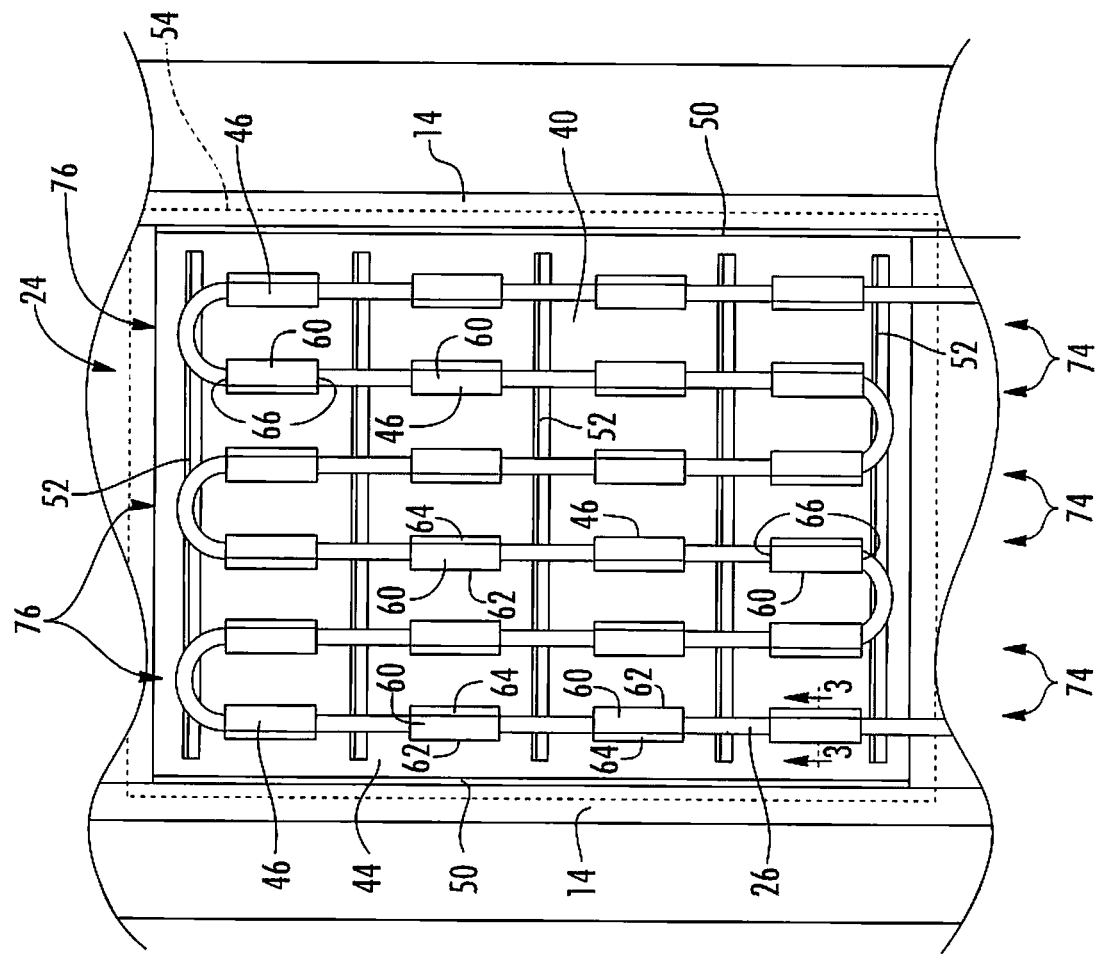
FIG. 2 is a schematic bottom view of the panel assembly of FIG. 1, with components removed to show details.

Referring to FIGS. 1 and 2, the panel assembly 24 includes a panel 40 formed of a sheet material having substantially opposed first and second surfaces 42, 44 with the first surface 42 facing toward the roof. A plurality of tubing fasteners 46 extend from, and holding a run of the tubing 26 against, the second surface 44 of the panel 40. Sidewalls 50 extend from the panel 40 and are secured to adjacent trusses 14. A plurality of standoff tabs 52 maintains a predetermined spacing between the panel 40 and the roof 12. An insulating member 54 (the insulating member 54 is removed in FIG. 2 to reveal additional details of the panel assembly 24, with its general location shown in broken lines) underlies the panel 40.

Figure 3:
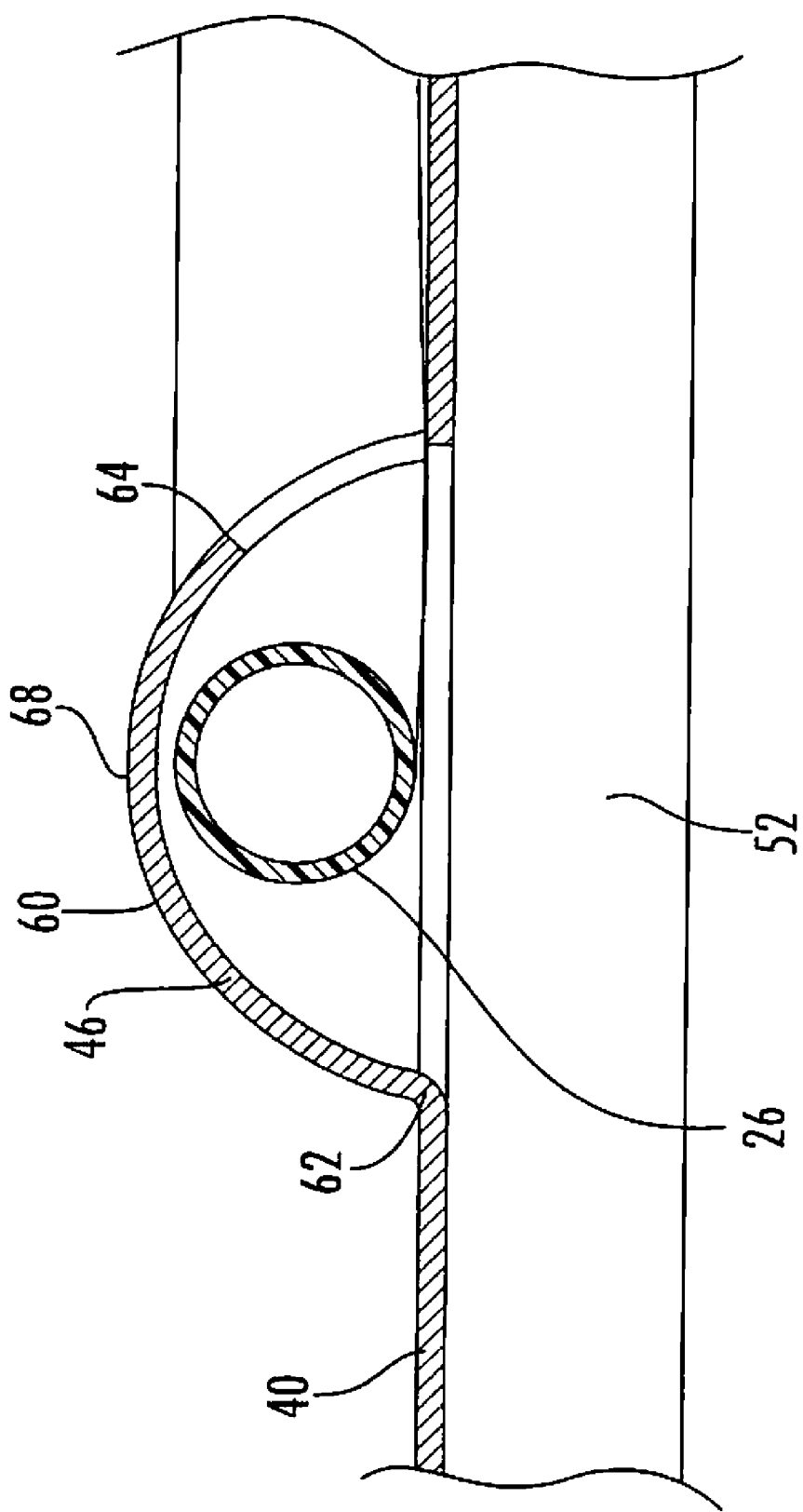
FIG. 3 is a cross-sectional view of a portion of the panel assembly taken along line 3-3 of FIG. 2.

Referring to FIGS. 2 and 3, each of the fasteners 46 includes a holding portion 60 with first and second edges 62, 64 extending between substantially opposed ends 66. The first edge 62 adjoins the panel 40 and the second edge 64 is spaced apart from the panel 40. The holding portion 60 is curved such that an apex 68 of the curve is further from the panel 40 than the second edge 64.

Referring again to FIG. 2, the fasteners 46 are arranged in a plurality of rows 74 with the opposed ends 66 of adjacent fasteners 46 in the row being substantially aligned, such that the tubing 26 can run approximately straight through the fasteners in each row 74. The tubing 26 bends back and forth between the rows 74 to form a plurality of loops 76. In each row 74, each fastener 46 has a length approximately equal to the spacing between adjacent fasteners 46. Also, the first edges 62 of adjacent fasteners 46 in each row 74 adjoin the panel 40 at alternate sides of their respective holding portions 60.

Figure 4:
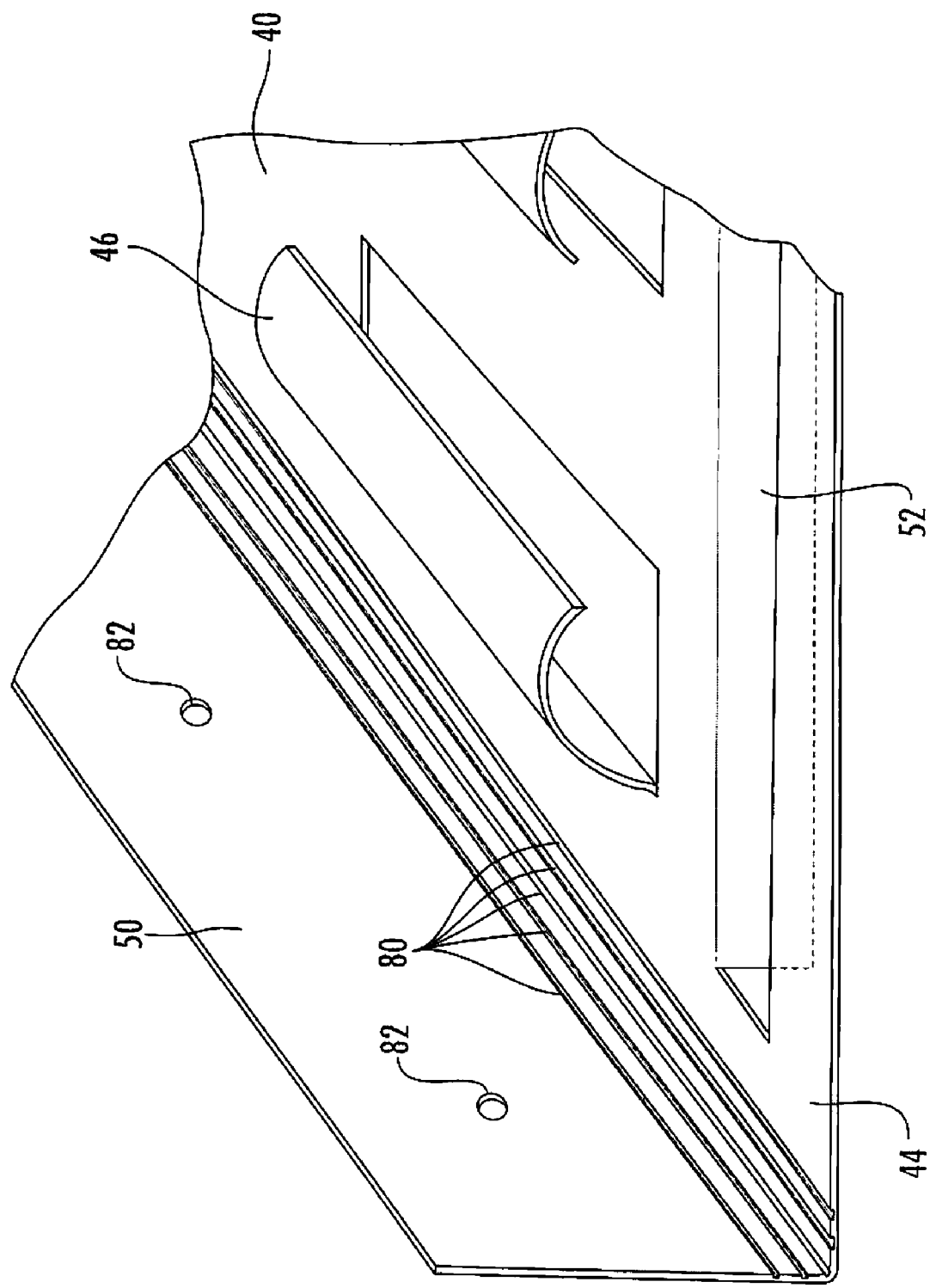
FIG. 4 is a detailed perspective view of another portion of the panel assembly of FIG. 1, with components removed to show details.

Referring to FIG. 4, the fasteners 46 and the standoff tabs 52 are advantageously formed by partially cutting out and folding portions of the sheet of material that forms the panel 40. The sidewalls 50 are advantageously formed by folding edges of the sheet of material towards the second surface 44 of the panel 40. The sidewalls 50 are folded along one of a plurality of lines of weakness 80, such as creases, perforations, or the like. A plurality of penetrations 82 are formed through the sidewalls 50 to facilitate attachment of the sidewalls 50 to the trusses 14.

To install the system 20, a panel assembly 24 is formed by partially cutting out and bending the tubing fasteners 46 and standoff tabs 52, as described above in reference to FIG. 4, and the lines of weakness 80 are formed, for instance by pre-bending and then unbending the sheet of material at the desired location of each line of weakness 80. When the panel assembly 24 is to be installed under the roof 12 between the adjacent trusses 14 (see FIGS. 1 and 2), each sidewall 50 is folded into position along an appropriate line of weakness 80 based on the actual spacing between the adjacent trusses 14. The panel assembly 24 is then inserted between the adjacent trusses 14 until the standoff tabs 52 contact the underside of the roof 12. The panel assembly is then secured between the adjacent trusses by, for example, nails or screws inserted through the penetrations 82 of the sidewalls 50 (see FIG. 4).

Based on length of run and number of loops desired, tubing 26 is then inserted into the appropriate number of fasteners 46 by pressing the tubing 26 into each holding portion 60 between the second edge 64 and the panel 40 (see FIG. 3). Once the desired run of tubing 26 has been attached to the panel assembly 24, the insulating member 54 is installed underlying the panel assembly 24. The tubing 26 is then connected to the support equipment 22 (see FIG. 1).

By direction of the electronic control unit 34, the pump 30 pumps fluid to be heated from the holding tank 32 up to the panel assembly 24. A portion of the radiant heat from outside the building 10 is transmitted through the roof. The insulating member 54 helps trap this heat between the trusses 14 in the area of the panel assembly 24. The panel assembly 24 facilitates transfer of the trapped heat from the panel 40 and surrounding air into the fluid circulating through the tubing 26. The heated fluid returns to the holding tank 32, where it is, for example, stored, drawn off directly, or used to heat another fluid also circulating through the holding tank 32.

It will be appreciated from the foregoing that the panel assembly 24 may be easily and inexpensively formed from a single sheet of material in a variety of lengths and widths. In addition to being easily and inexpensively formed, the panel assembly 24 offers several other benefits. For example, the panel assembly 24 is both readily installed in new construction, before or after installation of the roof, and retrofitted into existing structures. The flexible number of loops 76 of tubing 26 can be quickly attached thereto using all or a portion of the tubing fasteners 46. Inspection and replacement of the tubing 26 is correspondingly easy, and can be readily accomplished without removing the panel assembly 24.

Also, the sidewalls 52 allow attachment to the trusses, avoiding possible damage to the roof 12 from installation of the panel assembly 24. The plurality of lines of weakness 80 allow for ready adaptation to irregularities in framing. The standoff tabs 52 help prevent interference between roof hardware, such as roofing nails, staples, cut-out penetrations, mending plates and the like, and the panel assembly 24. This prevention of interference helps prevent damage to the panel assembly 24 and tubing 26 both during installation of the panel assembly and in the event re-roofing is subsequently required.

The preceding description and accompanying drawings are intended to describe preferred embodiments of the invention, and should not be understood as limiting the scope of the invention to, or as requiring each and every element of, the particular embodiments described. Instead, those skilled in the art will appreciate that various modifications of the present invention, and adaptations to particular circumstances fall well within the scope of the present invention.

For example, the present invention is not necessarily limited to installation in a particular sort of building 10, under a particular type of roof 12, or a particular type of truss 14. For instance, the building 10 could be a home, a shed or barn, a factory, or any other structure with some type of a roof covering either all or a portion of such structure. The roof 12 could, for instance, be installed at any angle or constructed out of any material, such as shingle, tile, thatch, metal, rubber, or concrete. The term "roof," as used herein, should be understood to include both the outer sheathing, such as shingles, and a substrate to which the outer sheathing is directly attached, where applicable, such as plywood or battens under a shingle roof. The term "truss," as used herein, should be understood as generally referring to the structural members directly supporting the roof. For instance, rafters, or joists under a flat roof, should be understood as trusses in the context of this application.

Additionally, the present invention is not necessarily limited to the use of the support equipment 22 shown and described herein, or to any particular support equipment. More or less components could be used, and different types of support equipment 22, as known to those skilled in the art, could also be used in connection with the present invention. For example, the holding tank 22 could also be a storage tank or a heat exchanger, or omitted.

Also, only a single panel assembly 24 is described and shown in the accompanying drawings. However, the present invention is not necessarily limited to any particular number of panel assemblies 24. For instance, a solar heating system 20 according to the present invention could incorporate multiple panel assemblies 24 between given trusses 14, as well as multiple panel assemblies 24 between multiple trusses 14, on one or both sides of the roof 12.

Furthermore, the present invention is not necessarily limited to a panel 24 of particular dimensions. For typical truss arrangements, the width of the panel 40 can be usefully set for 16 inch or 24 inch on-center truss spacing in most residential applications, with the lines of weakness spaced to accommodate for the expected irregularity in actual truss spacing in a given structure. An overall length of 4 feet for panel 40 has also been found useful for most residential applications.

Additionally, the present invention is not necessarily limited to a particular material or construction for the panel assembly. For instance, while it is highly advantageous to form the panel 40, the tubing fasteners 46, the sidewalls 50 and standoff tabs 52 from the same sheet of material, combinations of separate components or materials may also be used. Such components or materials could be attached, for example, by welding, brazing or pop-riveting. The material for the sheet is preferably thermally absorbent. Aluminum with a thermally absorbent coating, such as a black paint, has been found to be to give satisfactory performance, be easy to work with, and relatively inexpensive, though other materials could also be used.

Additionally, the present invention is not limited to a particular type of tubing 26. Cross-linked polyethylene, commonly abbreviated PEX or XLPE, has been found satisfactory, both in terms of its endurance, flexibility and ease of use. Other materials could also be used, such as rubber, various plastics, or metals. The present invention is not necessarily limited to any particular arrangement of the tubing 26 on the panel assembly 24, though rows 74 forming one or more loops 76 have been found advantageous for maximizing heat transfer. For instance, a 3 inch spacing between 2 to 8 adjacent rows 74 on the panel 40 has been found advantageous.

Likewise, the present invention is not necessarily limited to any particular number, arrangement, or spacing of the tubing fasteners 46, although fasteners 46 having a length equal to the spacing therebetween have also been found advantageous for maximizing heat transfer. Additionally, the present invention is not necessarily limited to a particular number or configuration of sidewalls 50 or standoff tabs 52, and the present invention includes panel assemblies 24 or solar heating systems 20 with or without such elements.

Additionally, the present invention is not limited to a particular insulating member 54, and includes panel assemblies 24 with or without insulating members. A rigid panel, batts or blankets are examples of suitable insulating members. Also, spray-in insulation could also be applied under the panel 40 as an insulating member.

The foregoing is not intended to be an exclusive list of the modifications or adaptations that fall within the scope of the present invention, but is only illustrative of some modifications and adaptations. Those skilled in the art will appreciate that additional modifications and adaptations are possible within the scope of the invention herein described and claimed.

What is claimed is:

1. A solar heating system, the system comprising:
   a roof directly exposed to solar radiation;
   a pair of trusses supporting the roof;
   a panel formed of a sheet material, the panel having substantially opposed first and second surfaces and attached under the roof between the trusses with the first surface substantially facing the roof;
   a plurality of tubing fasteners extending outward from the second surface of the panel;
   at least one run of tubing held against the second surface of the panel by the plurality of tubing fasteners; and
   a plurality of standoff tabs extending from the first surface of the panel;
   wherein the plurality of standoff tabs are partially cut-out and bent portions of the sheet material and are dimensioned to prevent interference between the panel and roof hardware; and
   wherein at least one of the standoff tabs contacts the roof.

2. The system of claim 1, wherein the plurality of tubing fasteners are partially cut-out and bent portions of the sheet material.

3. The system of claim 1, wherein each of the plurality of tubing fasteners has a holding portion with first and second edges extending between substantially opposed ends through which the tubing runs, the first edge adjoining the panel and the second edge spaced away from the panel.

4. The system of claim 3, wherein the plurality of tubing fasteners are arranged in at least one row with the ends of adjacent tubing fasteners in the row being substantially aligned such that the tubing runs approximately straight therethrough.

5. The system of claim 4, wherein a length of each tubing fastener in the row is approximately equal to a distance between adjacent tubing fasteners in the row.

6. The system of claim 4, wherein the first edges of adjacent tubing fasteners in the row adjoin the panel at alternating sides of their respective holding portions.

7. The system of claim 3, wherein the holding portion of each tubing fastener has a curved cross-section between the first and second edges.

8. The system of claim 6, wherein the second edge is closer to the panel than an apex of the curved cross-section.

9. The system of claim 1, further comprising at least one sidewall extending from an edge of the panel and attached to one of the pair of trusses, wherein the sidewall is formed by folding a portion of the sheet material toward the second surface.

10. The system of claim 9, wherein the sheet material is folded along a line of weakness to form the sidewall.

11. The system of claim 10, wherein at least one other line of weakness is formed proximate and approximately parallel to the line of weakness along which the sheet material is folded.

12. The system of claim 9, wherein the sidewall portion includes a plurality of penetrations formed therethrough, through which the sidewall is attached to the one of the pair of trusses.

13. The system of claim 1, further comprising an insulating member underlying the panel extending between the pair of trusses.

14. A method of installing a solar heating system under a roof directly exposed to solar radiation, the method comprising:

bending a sheet material along lines of weakness to form a pair of sidewalls and a panel, a plurality of standoff tabs extending from a first surface of the panel and a plurality of tubing fasteners extending from a second surface of the panel, the sidewalls being bent toward the second surface of the panel to engage a pair of adjacent trusses;

inserting the sheet of material with the first surface of the panel facing the roof; and attaching the sidewalls to the trusses;

wherein inserting the sheet of material includes inserting the sheet of material until at least one of the standoff tabs contacts the roof; and wherein the plurality of standoff tabs are dimensioned to prevent interference between the panel and roof hardware.

15. The method of claim 14, further comprising securing at least one run of tubing to the second surface of the panel with the plurality of tubing fasteners.

16. The method of claim 14, further comprising attaching an insulating member below the sheet of material.

17. The method of claim 14, wherein attaching the sidewalls to the trusses includes inserting fasteners through penetrations in the sidewalls.

* * * * *